United States Patent
Whitmarsh et al.

(10) Patent No.: US 8,475,336 B2
(45) Date of Patent: Jul. 2, 2013

(54) HYDRAULIC CONTROL SYSTEM FOR A DUAL CLUTCH TRANSMISSION

(75) Inventors: Brian W. Whitmarsh, Commerce, MI (US); Bret M. Olson, Whitelake, MI (US); Philip C. Lundberg, Keego Harbor, MI (US); Wayne B. Vogel, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 634 days.

(21) Appl. No.: 12/723,477

(22) Filed: Mar. 12, 2010

(65) Prior Publication Data
US 2011/0028271 A1    Feb. 3, 2011

Related U.S. Application Data

(60) Provisional application No. 61/230,015, filed on Jul. 30, 2009.

(51) Int. Cl.
*B60W 10/02* (2006.01)
*B60W 10/10* (2012.01)
*F16H 61/26* (2006.01)
*F16D 48/06* (2006.01)
*F16D 25/10* (2006.01)

(52) U.S. Cl.
USPC ............... 477/79; 477/86; 477/123; 192/3.58

(58) Field of Classification Search
USPC ............................... 477/79, 86, 123; 192/3.58
See application file for complete search history.

(56) References Cited

U.S. PATENT DOCUMENTS

| | | | |
|---|---|---|---|
| 3,834,499 A | 9/1974 | Candellero et al. | |
| 4,653,352 A | 3/1987 | Nakao et al. | |
| 4,924,983 A | 5/1990 | Katayama et al. | |
| 4,944,202 A | 7/1990 | Gierer | |
| 5,441,459 A | 8/1995 | Inukai et al. | |
| 5,966,989 A | 10/1999 | Reed, Jr. et al. | |
| 5,992,590 A | 11/1999 | Harries | |
| 6,361,287 B1 | 3/2002 | Hopper | |
| 6,631,651 B2 | 10/2003 | Petrzik | |
| 6,698,304 B2 | 3/2004 | Gierling et al. | |
| 6,715,597 B1 | 4/2004 | Buchanan | |
| 6,789,658 B2 | 9/2004 | Busold et al. | |
| 6,827,191 B2 | 12/2004 | Kuhstrebe | |
| 6,883,394 B2 | 4/2005 | Koenig et al. | |
| 6,941,830 B2 | 9/2005 | Ibamoto et al. | |
| 7,300,375 B2 | 11/2007 | Petrzik | |
| 7,401,689 B2 * | 7/2008 | Hegerath et al. | 192/3.58 |

(Continued)

FOREIGN PATENT DOCUMENTS

| | | |
|---|---|---|
| DE | 2141564 A1 | 2/1973 |
| DE | 102202 C | 12/1973 |

(Continued)

*Primary Examiner* — Justin Holmes
*Assistant Examiner* — Jacob S Scott

(57) ABSTRACT

A hydraulic control system for a dual clutch transmission includes a plurality of solenoids and valves in fluid communication with a plurality of clutch actuators and with a plurality of synchronizer actuators. The clutch actuators are operable to actuate a plurality of torque transmitting devices and the synchronizer actuators are operable to actuate a plurality of synchronizer assemblies. Selective activation of combinations of the solenoids allows for a pressurized fluid to activate at least one of the clutch actuators and synchronizer actuators in order to shift the transmission into a desired gear ratio.

17 Claims, 3 Drawing Sheets

U.S. PATENT DOCUMENTS

| | | | |
|---|---|---|---|
| 7,410,438 B2 * | 8/2008 | Moehlmann et al. | 192/3.58 |
| 7,464,617 B2 | 12/2008 | Baldascini et al. | |
| 7,464,618 B2 * | 12/2008 | Mohlmann et al. | 477/143 |
| 7,472,616 B2 | 1/2009 | Dreher et al. | |
| 7,478,572 B2 | 1/2009 | Maten et al. | |
| 7,487,866 B2 | 2/2009 | Kruse et al. | |
| 7,591,203 B2 | 9/2009 | Ochi et al. | |
| 7,752,935 B2 * | 7/2010 | Vernacchia et al. | 74/335 |
| 8,206,265 B2 * | 6/2012 | Maten et al. | 477/130 |
| 2001/0036878 A1 | 11/2001 | Itou et al. | |
| 2002/0060113 A1 | 5/2002 | Harries | |
| 2002/0119864 A1 | 8/2002 | Harries | |
| 2003/0075408 A1 | 4/2003 | Alfredsson | |
| 2003/0226416 A1 | 12/2003 | Umemoto et al. | |
| 2004/0038765 A1 | 2/2004 | Fujimine et al. | |
| 2005/0067251 A1 | 3/2005 | Braford, Jr. et al. | |
| 2005/0107214 A1 | 5/2005 | Koenig | |
| 2007/0175726 A1 | 8/2007 | Combes et al. | |
| 2008/0207392 A1 | 8/2008 | Staudinger et al. | |
| 2008/0210032 A1 | 9/2008 | Uberti et al. | |
| 2008/0223683 A1 | 9/2008 | Grethel | |
| 2009/0000897 A1 | 1/2009 | Staudinger et al. | |
| 2009/0151495 A1 | 6/2009 | Garabello et al. | |
| 2009/0157271 A1 | 6/2009 | Garabello et al. | |

FOREIGN PATENT DOCUMENTS

| | | |
|---|---|---|
| DE | 3213758 A1 | 1/1983 |
| DE | 3546454 A1 | 2/1987 |
| DE | 4027508 A1 | 3/1991 |
| DE | 4117736 C1 | 5/1992 |
| DE | 4128389 A1 | 3/1993 |
| DE | 4320353 A1 | 1/1994 |
| DE | 19538808 A1 | 5/1996 |
| DE | 19637001 A1 | 3/1997 |
| DE | 29714652 U1 | 10/1997 |
| DE | 19813982 A1 | 10/1999 |
| DE | 19921301 A1 | 11/1999 |
| DE | 19849488 A1 | 5/2000 |
| DE | 19857222 A1 | 6/2000 |
| DE | 19931973 A1 | 1/2001 |
| DE | 10020187 A1 | 10/2001 |
| DE | 10147123 A1 | 4/2002 |
| DE | 10125172 A1 | 11/2002 |
| DE | 10134115 A1 | 1/2003 |
| DE | 10250733 A1 | 6/2003 |
| DE | 10243282 A1 | 4/2004 |
| DE | 10327406 A1 | 2/2005 |
| DE | 10343992 A1 | 4/2005 |
| DE | 10349841 A1 | 5/2005 |
| DE | 102004001753 A1 | 8/2005 |
| DE | 102005006431 A1 | 8/2006 |
| DE | 102005029962 A1 | 1/2007 |
| DE | 102005029967 A1 | 1/2007 |
| DE | 102005029963 A1 | 2/2007 |
| DE | 102005029964 A1 | 3/2007 |
| DE | 102008008454 A1 | 9/2008 |
| DE | 102008058692 A1 | 6/2009 |
| EP | 0157086 | 10/1985 |
| EP | 0212182 A1 | 3/1987 |
| EP | 0475488 A1 | 3/1992 |
| EP | 0477564 A2 | 4/1992 |
| EP | 0933564 A2 | 8/1999 |
| EP | 0976952 A1 | 2/2000 |
| EP | 1059470 A | 12/2000 |
| EP | 1400733 A2 | 3/2004 |
| EP | 1433976 A1 | 6/2004 |
| EP | 1469235 A1 | 10/2004 |
| EP | 1519082 A1 | 3/2005 |
| EP | 1589262 A1 | 10/2005 |
| EP | 1645786 A2 | 4/2006 |
| EP | 1767824 A1 | 3/2007 |
| EP | 1899629 A2 | 3/2008 |
| EP | 2151586 A2 | 2/2010 |
| FR | 2756597 A1 | 6/1998 |
| FR | 2808065 A1 | 10/2001 |
| GB | 1142506 A | 2/1969 |
| JP | 58102851 A | 6/1983 |
| JP | 2007010145 A | 1/2007 |
| WO | WO9705410 A1 | 2/1997 |
| WO | WO9919644 | 4/1999 |
| WO | WO2004097265 A1 | 11/2004 |
| WO | WO2005037590 A2 | 4/2005 |
| WO | WO2009037170 A1 | 3/2009 |
| WO | WO2010028745 A2 | 3/2010 |

\* cited by examiner

HYDRAULIC CONTROL SYSTEM FOR A DUAL CLUTCH TRANSMISSION

CROSS-REFERENCE TO RELATED APPLICATIONS

This application claims the benefit of U.S. Provisional Application No. 61/230,015, filed on Jul. 30, 2009, which is hereby incorporated in its entirety herein by reference.

TECHNICAL FIELD

The invention relates to a control system for a dual clutch transmission, and more particularly to an electro-hydraulic control system having a plurality of solenoids and valves operable to actuate a plurality of actuators within the dual clutch transmission.

BACKGROUND

A typical multi-speed, dual clutch transmission uses a combination of two friction clutches and several dog clutch/synchronizers to achieve "power-on" or dynamic shifts by alternating between one friction clutch and the other, with the synchronizers being "pre-selected" for the oncoming ratio prior to actually making the dynamic shift. "Power-on" shifting means that torque flow from the engine need not be interrupted prior to making the shift. This concept typically uses countershaft gears with a different, dedicated gear pair or set to achieve each forward speed ratio. Typically an electronically controlled hydraulic control circuit or system is employed to control solenoids and valve assemblies. The solenoid and valve assemblies actuate clutches and synchronizers to achieve the forward and reverse gear ratios.

While previous hydraulic control systems are useful for their intended purpose, the need for new and improved hydraulic control system configurations within transmissions which exhibit improved performance, especially from the standpoints of increased fuel economy and safety, is essentially constant. Accordingly, there is a need for an improved, cost-effective hydraulic control system for use in a dual clutch transmission.

SUMMARY

A hydraulic control system for a dual clutch transmission includes a plurality of solenoids and valves in fluid communication with a plurality of clutch actuators and with a plurality of synchronizer actuators. The clutch actuators are operable to actuate a plurality of torque transmitting devices and the synchronizer actuators are operable to actuate a plurality of synchronizer assemblies. Selective activation of combinations of the solenoids allows for a pressurized fluid to activate at least one of the clutch actuators and synchronizer actuators in order to shift the transmission into a desired gear ratio.

In one aspect of the present invention, the hydraulic control system includes an electric pump and an accumulator that provide a pressurized hydraulic fluid.

In another aspect of the present invention, the hydraulic control system includes four variable force solenoids in communication with an electric pump and an accumulator.

In yet another aspect of the present invention, the hydraulic control system includes four variable force solenoids in communication with the electric pump and the accumulator, two variable force solenoids or variable flow solenoids in communication with two clutch actuating devices, and two on/off solenoids in communication with three logic valve assemblies.

In yet another aspect of the present invention, the hydraulic control system includes a supply valve in communication with the on/off solenoids.

In yet another aspect of the present invention, a hydraulic control system for controlling a dual clutch transmission is provided. The hydraulic control system includes a source of pressurized hydraulic fluid, a first, a second, a third and a fourth variable force solenoids, a first flow control solenoid, a second flow control solenoid, a first clutch actuator, a second clutch actuator, a first, second and third logic valve assembly and four synchronizer actuators. The four variable force solenoids are pressure control solenoids in one embodiment of the present invention and flow control solenoids in another embodiment of the present invention depending on the hydraulic control system requirements.

The first, second, third and fourth variable force solenoids are in downstream fluid communication with the source of pressurized hydraulic fluid. The first flow control solenoid is in downstream fluid communication with the first variable force control solenoid. The second flow control solenoid is in downstream fluid communication with the second pressure control solenoid. The first clutch actuator is in downstream fluid communication with the first flow control solenoid for selectively actuating a first clutch of the dual clutch transmission. The second clutch actuator is in downstream fluid communication with the second flow control solenoid for selectively actuating a second clutch of the dual clutch transmission. The first logic valve assembly is in downstream fluid communication with the third and the fourth variable force solenoid. The first logic control valve assembly has a valve movable between a first and a second position. The second logic valve assembly is in downstream fluid communication with the first logic valve assembly. The second logic control valve assembly has a valve movable between a first and a second position. The third logic valve assembly is in downstream fluid communication with the first logic valve assembly. The third logic control valve assembly has a valve movable between a first and a second position. The first actuator is in downstream fluid communication with the second logic valve assembly. The first actuator is movable between a first and second position when the valve of the first logic control valve assembly is in the first position and the valve of second logic control valve assembly is in the first position. The second actuator is in downstream fluid communication with the second logic valve assembly. The second actuator is movable between a first and second position when the valve of the first logic control valve assembly is in the first position and the valve of second logic control valve assembly is in the second position. The third actuator is in downstream fluid communication with the third logic valve assembly. The third actuator is movable between a first and second position when the valve of the first logic control valve assembly is in the second position and the valve of third logic control valve assembly is in the first position. The fourth actuator is in downstream fluid communication with the third logic valve assembly. The fourth actuator is movable between a first and second position when the valve of the first logic control valve assembly is in the second position and the valve of third logic control valve assembly is in the second position. The third variable force solenoid generates a first hydraulic fluid pressure to move at least one of the four actuators into the first position and the fourth variable force solenoid generates a second hydraulic fluid pressure to move the at least one of the four actuators into the second position.

Further aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
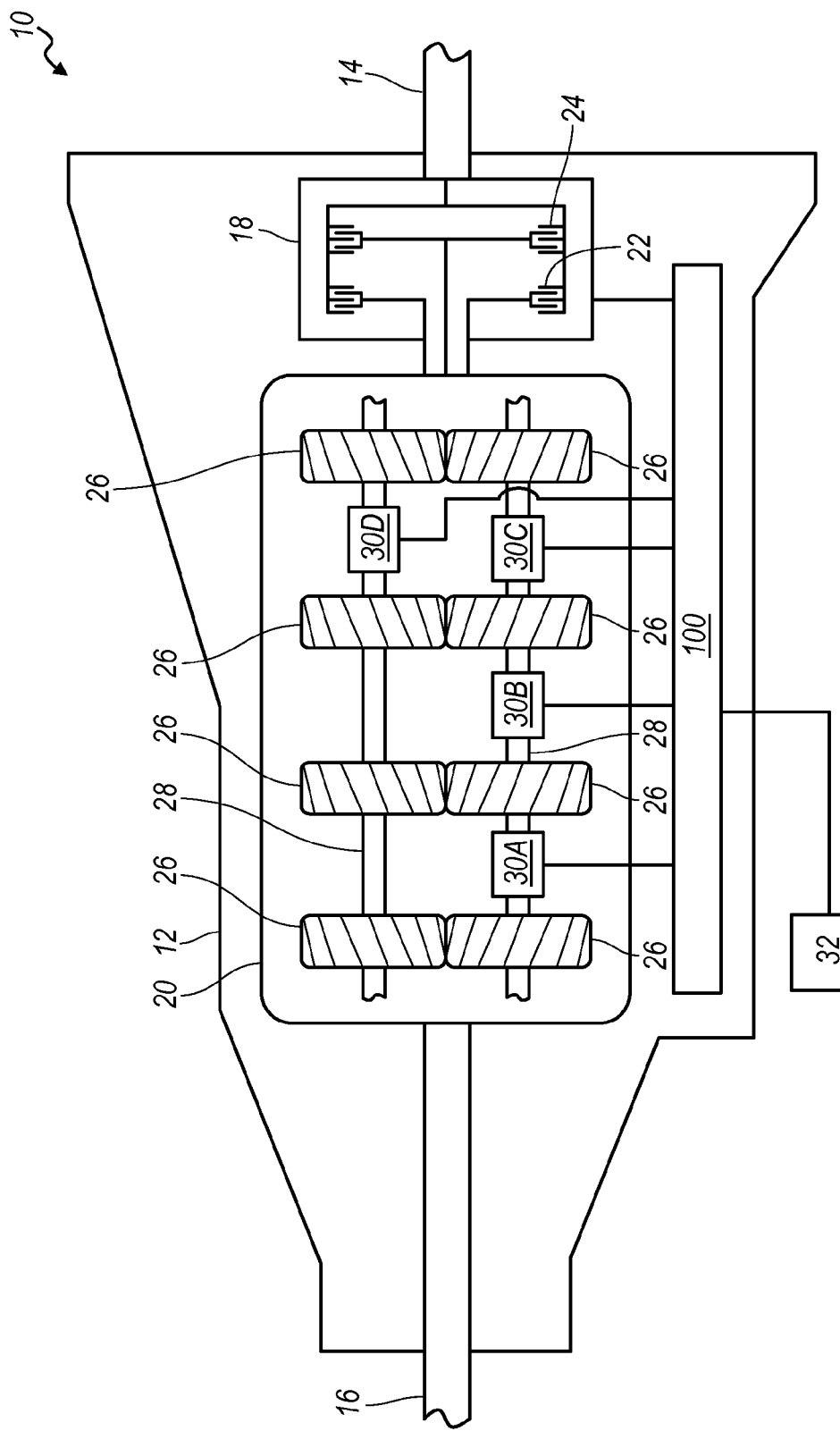
FIG. 1 is a schematic diagram of an exemplary dual clutch automatic transmission incorporating a hydraulic control system according to the principles of the present invention.

With reference to FIG. 1, an exemplary dual clutch automatic transmission incorporating the present invention is illustrated and generally designated by the reference number 10. The dual clutch transmission 10 includes a typically cast, metal housing 12 which encloses and protects the various components of the transmission 10. The housing 12 includes a variety of apertures, passageways, shoulders and flanges which position and support these components. The transmission 10 includes an input shaft 14, an output shaft 16, a dual clutch assembly 18, and a gear arrangement 20. The input shaft 14 is connected with a prime mover (not shown) such as an internal combustion gas or Diesel engine or a hybrid power plant. The input shaft 14 receives input torque or power from the prime mover. The output shaft 16 is preferably connected with a final drive unit (not shown) which may include, for example, propshafts, differential assemblies, and drive axles. The input shaft 14 is coupled to and drives the dual clutch assembly 18. The dual clutch assembly 18 preferably includes a pair of selectively engageable torque transmitting devices including a first torque transmitting device 22 and a second torque transmitting device 24. The torque transmitting devices 22, 24 are mutually exclusively engaged to provide drive torque to the gear arrangement 20.

The gear arrangement 20 includes a plurality of gear sets, indicated generally by reference number 26, and a plurality of shafts, indicated generally by reference number 28. The plurality of gear sets 26 includes individual intermeshing gears that are connected to or selectively connectable to the plurality of shafts 28. The plurality of shafts 28 may include layshafts, countershafts, sleeve and center shafts, reverse or idle shafts, or combinations thereof. It should be appreciated that the specific arrangement and number of the gear sets 26 and the specific arrangement and number of the shafts 28 within the transmission 10 may vary without departing from the scope of the present invention.

The gear arrangement 20 further includes a first synchronizer assembly 30A, a second synchronizer assembly 30B, a third synchronizer assembly 30C, and a fourth synchronizer assembly 30D. The synchronizer assemblies 30A-D are operable to selectively couple individual gears within the plurality of gear sets 26 to the plurality of shafts 28. Each synchronizer assembly 30A-D is disposed either adjacent certain single gears or between adjacent pairs of gears within adjacent gear sets 26. Each synchronizer assembly 30A-D, when activated, synchronizes the speed of a gear to that of a shaft and a positive clutch, such as a dog or face clutch. The clutch positively connects or couples the gear to the shaft. The clutch is bi-directionally translated by a shift rail and fork assembly (not shown) within each synchronizer assembly 30A-D.

The transmission also includes a transmission control module 32. The transmission control module 32 is preferably an electronic control device having a preprogrammed digital computer or processor, control logic, memory used to store data, and at least one I/O peripheral. The control logic includes a plurality of logic routines for monitoring, manipulating, and generating data. The transmission control module 32 controls the actuation of the dual clutch assembly 18 and the synchronizer assemblies 30A-D via a hydraulic control system 100 according to the principles of the present invention.

Figure 2A:
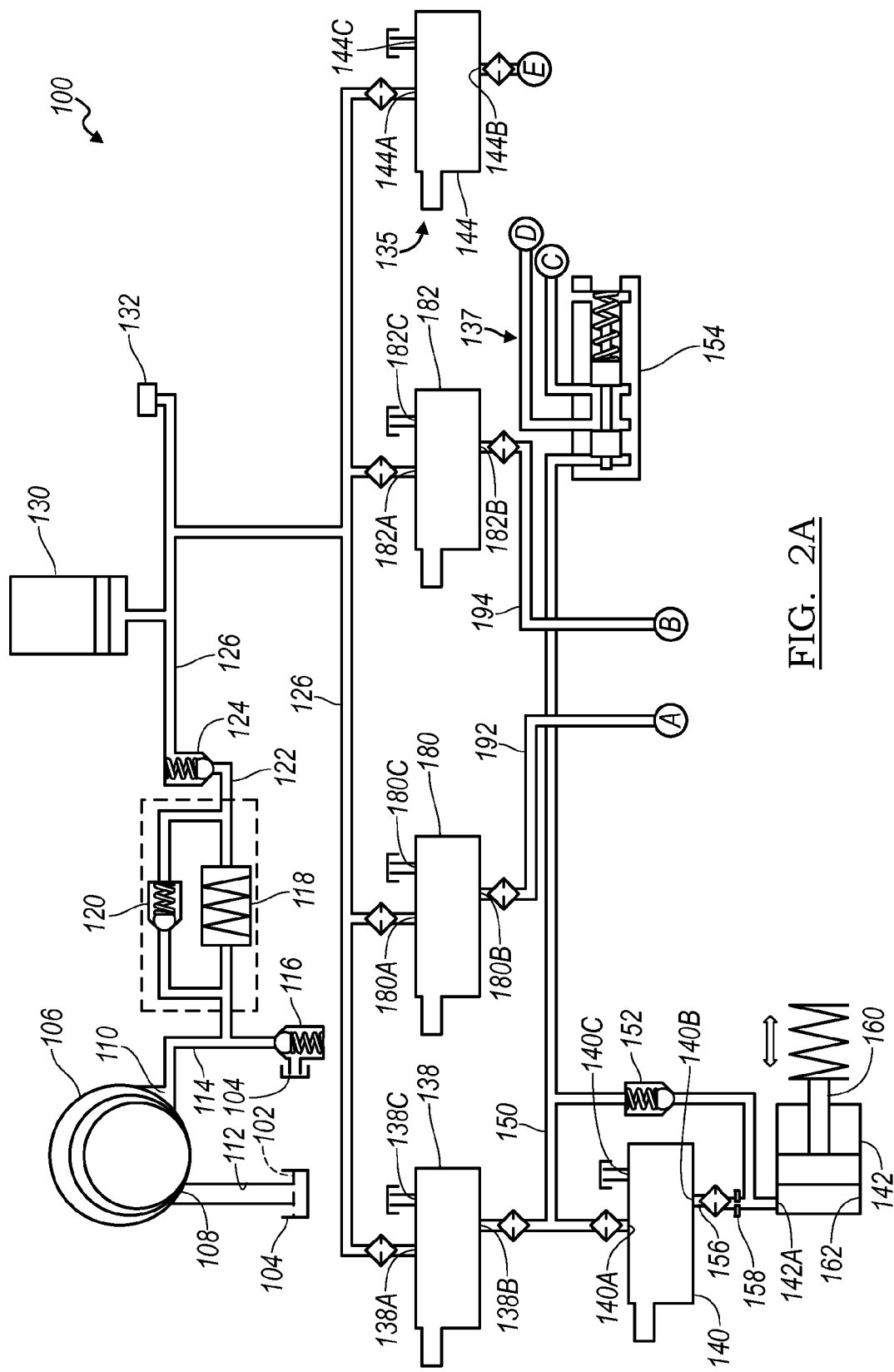
FIG. 2A is a schematic diagram of a first portion of an embodiment of a hydraulic control system for a dual clutch transmission according to the principles of the present invention.
Figure 2B:
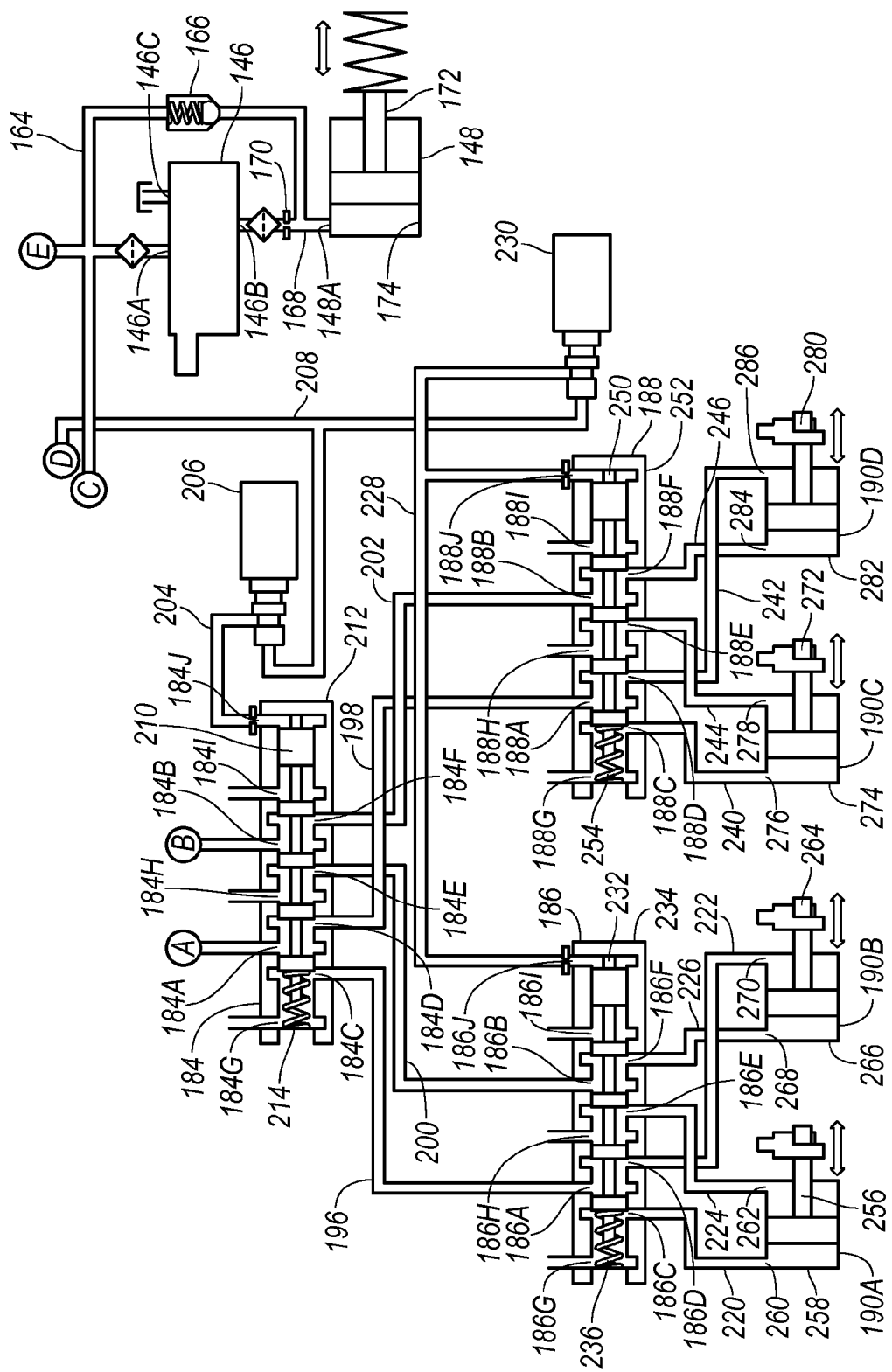
FIG. 2B is a schematic diagram of a second portion of an embodiment of a hydraulic control system for a dual clutch transmission according to the principles of the present invention.

Turning to FIGS. 2A and 2B, the hydraulic control system 100 of the present invention is operable to selectively engage the dual clutch assembly 18 and the synchronizer assemblies 30A-D by selectively communicating a hydraulic fluid 102 from a sump 104 to a plurality of shift actuating devices, as will be described in greater detail below. The sump 104 is a tank or reservoir preferably disposed at the bottom of the transmission housing 12 to which the hydraulic fluid 102 returns and collects from various components and regions of the automatic transmission 10. The hydraulic fluid 102 is forced from the sump 104 and communicated throughout the hydraulic control system 100 via a pump 106. The pump 106 is preferably driven by an electric engine (not shown) and may be, for example, a gear pump, a vane pump, a gerotor pump, or any other positive displacement pump. The pump 106 includes an inlet port 108 and an outlet port 110. The inlet port 108 communicates with the sump 104 via a suction line 112. The outlet port 110 communicates pressurized hydraulic fluid 102 to a supply line 114. The supply line 114 is in communication with a spring biased blow-off safety valve 116, a pressure side filter 118, and a spring biased check valve 120. The spring biased blow-off safety valve 116 communicates with the sump 104. The spring biased blow-off safety valve 116 is set at a relatively high predetermined pressure and if the pressure of the hydraulic fluid 102 in the supply line 114 exceeds this pressure, the safety valve 116 opens momentarily to relieve and reduce the pressure of the hydraulic fluid 102. The pressure side filter 118 is disposed in parallel with the spring biased check valve 120. If the pressure side filter 118 becomes blocked or partially blocked, pressure within supply line 114 increases and opens the spring biased check valve 120 in order to allow the hydraulic fluid 102 to bypass the pressure side filter 118.

The pressure side filter 118 and the spring biased check valve 120 each communicate with an outlet line 122. The outlet line 122 is in communication with a second check valve 124. The second check valve 124 is in communication with a main supply line 126 and is configured to maintain hydraulic pressure within the main supply line 126. The main supply line 126 supplies pressurized hydraulic fluid to an accumulator 130 and a main pressure sensor 132. The accumulator 130 is an energy storage device in which the non-compressible hydraulic fluid 102 is held under pressure by an external source. In the example provided, the accumulator 130 is a spring type or gas filled type accumulator having a spring or compressible gas that provides a compressive force on the hydraulic fluid 102 within the accumulator 130. However, it should be appreciated that the accumulator 130 may be of other types without departing from the scope of the present invention. Accordingly, the accumulator 130 is operable to supply pressurized hydraulic fluid 102 back to the main supply line 126. However, upon discharge of the accumulator 130, the second check valve 124 prevents the pressurized hydraulic fluid 102 from returning to the pump 106. The accumulator 130, when charged, effectively replaces the pump 106 as the source of pressurized hydraulic fluid 102, thereby eliminating the need for the pump 106 to run continuously. The main pressure sensor 132 reads the pressure of the hydraulic fluid 102 within the main supply line 126 in real time and provides this data to the transmission control module 32.

The hydraulic control system 100 further includes a plurality of solenoids and valves that direct the pressurized hydraulic fluid 102 delivered from the pump 106 or accumulator 130 via the main supply line 126 to a plurality of actuation devices that actuate the dual clutch assembly 18 and the synchronizers 30A-D. For example, the hydraulic control system 100 generally includes a clutch control subsystem 135 and a gear selection subsystem 137. The clutch control subsystem 135 includes a first pressure control solenoid 138, a first clutch flow control solenoid 140, a first clutch piston 142, a second pressure control solenoid 144, a second clutch flow control solenoid 146, and a second clutch piston 148.

The first pressure control solenoid 138 is preferably an electrically controlled variable force solenoid. The first pressure control solenoid 138 includes an inlet port 138A that communicates with an outlet port 138B when the first pressure control solenoid 138 is activated or energized and includes an exhaust port 138C that communicates with the outlet port 138B when the first pressure control solenoid 138 is inactive or de-energized. Variable activation of the first pressure control solenoid 138 regulates or controls the pressure of the hydraulic fluid 102 as the hydraulic fluid 102 communicates from the inlet port 138A to the outlet port 138B. The inlet port 138A is in communication with the main supply line 126. The outlet port 138B is in communication with a fluid line 150. The exhaust port 138C is in communication with the sump 104. In an alternate embodiment, the first pressure control solenoid 138 may be replaced with a feed limit valve and an on/off solenoid.

The fluid line 150 communicates the hydraulic fluid 102 from the first pressure control solenoid 138 to the first clutch flow control solenoid 140, to a first pressure limit control valve 152, and to a switching valve assembly 154. The first clutch flow control solenoid 140 is disposed in series with the first pressure control solenoid 138 and is preferably an electrically controlled variable flow solenoid, but can be a variable force solenoid that is operable to actuate the first torque transmitting device 22, as will be described in greater detail below. The first clutch flow control solenoid 140 includes an inlet port 140A that communicates with an outlet port 140B when the first clutch flow control solenoid 140 is activated or energized and includes an exhaust port 140C that communicates with the outlet port 140B when the first clutch flow control solenoid 140 is inactive or de-energized. Variable activation of the first clutch flow control solenoid 140 regulates or controls the flow of pressured hydraulic fluid 102 as the hydraulic fluid 102 communicates from the inlet port 140A to the outlet port 140B. The inlet port 140A is in communication with the fluid line 150. The outlet port 140B is in communication with a first clutch supply line 156. The exhaust port 140C is in communication with the sump 104. The first pressure limit control valve 152 is disposed in parallel with the first clutch flow control solenoid 140 and is in communication with the first clutch supply line 156. If pressure within the first clutch supply line 156 exceeds the pressure in fluid line 150 plus the first pressure limit control valve 152 spring force, the first pressure limit control valve 152 opens to relieve and reduce the pressure. Therefore, the first pressure limit control valve 152 acts as a secondary exhaust path for the first clutch piston assembly 142 during a quick clutch release or failure of the first clutch flow control solenoid 140.

The first clutch supply line 156 communicates through a flow restriction orifice 158 with an inlet port 142A in the first clutch piston assembly 142. The first clutch piston assembly 142 includes a single acting piston 160 slidably disposed in a cylinder 162. The piston 160 translates under hydraulic pressure to engage the first torque transmitting device 22, shown in FIG. 1. When the first clutch flow control solenoid 140 is activated or energized, pressurized hydraulic fluid 102 is provided to the first clutch supply line 156. The pressurized hydraulic fluid 102 is communicated from the first clutch supply line 156 to the first clutch piston assembly 142 where the pressurized hydraulic fluid 102 translates the piston 160, thereby engaging the first torque transmitting device 22. The position of the piston 160 is communicated to the transmission controller 32 via a clutch position sensor (not shown). When the first clutch flow control solenoid 140 is de-energized, the inlet port 140A is closed and hydraulic fluid from the cylinder 162 passes from the outlet port 140B to the exhaust port 140C and into the sump 104, thereby disengaging the first torque transmitting device 22.

Hydraulic fluid in the main supply line 126 is also communicated to the second pressure control solenoid 144. The second pressure control solenoid 144 is preferably an electrically controlled variable force solenoid. The second pressure control solenoid 144 includes an inlet port 144A that communicates with an outlet port 144B when the second pressure control solenoid 144 is activated or energized and includes an exhaust port 144C that communicates with the outlet port 144B when the second pressure control solenoid 144 is inactive or de-energized. Variable activation of the second pressure control solenoid 144 regulates or controls the pressure of the hydraulic fluid 102 as the hydraulic fluid 102 communicates from the inlet port 144A to the outlet port 144B. The inlet port 144A is in communication with the main supply line 126. The outlet port 144B is in communication with a fluid line 164. The exhaust port 144C is in communication with the sump 104. In an alternate embodiment, the second pressure control solenoid 144 may be replaced with a feed limit valve and an on/off solenoid.

Fluid line 164 communicates the hydraulic fluid 102 from the second pressure control solenoid 144 to the second clutch flow control solenoid 146, to a second pressure limit control valve 166, and to the switching valve assembly 154. The second clutch flow control solenoid 146 is preferably an electrically controlled variable flow solenoid, but can be a variable force solenoid, that is operable to actuate the second torque transmitting device 24, as will be described in greater detail below. The second clutch flow control solenoid 146 includes an inlet port 146A that communicates with an outlet port 146B when the second clutch flow control solenoid 146 is activated or energized and includes an exhaust port 146C that communicates with the outlet port 146B when the second clutch flow control solenoid 146 is inactive or de-energized. Variable activation of the second clutch flow control solenoid 146 regulates or controls the pressure of the hydraulic fluid 102 as the hydraulic fluid 102 communicates from the inlet port 146A to the outlet port 146B. The inlet port 146A is in communication with fluid line 164. The outlet port 146B is in communication with a second clutch supply line 168. The exhaust port 146C is in communication with the sump 104. The second pressure limit control valve 166 is disposed in parallel with the second clutch flow control solenoid 146 and is in communication with the second clutch supply line 168. If pressure within the second clutch supply line 168 exceeds the pressure in fluid line 164 plus the second pressure limit control valve 166 spring force, the second pressure limit control valve 166 opens to relieve and reduce the pressure. Therefore, the second pressure limit control valve 166 acts as a secondary exhaust path for the second clutch piston assembly 148 during a quick clutch release or failure of the second clutch flow control solenoid 146.

The second clutch supply line 168 communicates through a flow restriction orifice 170 with an inlet port 148A in the second clutch piston assembly 148. The second clutch piston assembly 148 includes a single acting piston 172 slidably disposed in a cylinder 174. The piston 172 translates under hydraulic pressure to engage the second torque transmitting device 24, shown in FIG. 1. When the second clutch flow control solenoid 146 is activated or energized, pressurized hydraulic fluid 102 is provided to the second clutch supply line 168. The pressurized hydraulic fluid 102 is communicated from the second clutch supply line 168 to the second clutch piston assembly 148 where the pressurized hydraulic fluid 102 translates the piston 172, thereby engaging the second torque transmitting device 24. The position of the piston 172 is communicated to the transmission controller 32 via a clutch position sensor (not shown). When the second clutch flow control solenoid 146 is de-energized, the inlet port 146A is closed and hydraulic fluid from the cylinder 174 passes from the outlet port 146B to the exhaust port 146C and into the sump 104, thereby disengaging the second torque transmitting device 24.

The gear selection subsystem 137 includes a first synchronizer pressure or flow control solenoid 180, a second synchronizer pressure or flow control solenoid 182, a first logic valve assembly 184, a second logic valve assembly 186, a third logic valve assembly 188, a first synchronizer actuator 190A, a second synchronizer actuator 190B, a third synchronizer actuator 190C, and a fourth synchronizer actuator 190D.

The main supply line 126 communicates pressurized hydraulic fluid 102 to the first synchronizer pressure or flow control solenoid 180 and the second synchronizer pressure or flow control solenoid 182. More specifically, the first synchronizer pressure or flow control solenoid 180 is preferably an electrically controlled variable force solenoid, but can be a variable flow solenoid. The first synchronizer pressure or flow control solenoid 180 is operable to control the pressure of hydraulic fluid 102 delivered to one side of each of the synchronizer actuators 190A-D, as will be described in greater detail below. The first synchronizer pressure or flow control solenoid 180 includes an inlet port 180A that communicates with an outlet port 180B when the first synchronizer pressure or flow control solenoid 180 is activated or energized and includes an exhaust port 180C that communicates with the outlet port 180B when the first synchronizer pressure or flow control solenoid 180 is inactive or de-energized. Variable activation of the first synchronizer pressure or flow control solenoid 180 regulates or controls the pressure of the hydraulic fluid 102 as the hydraulic fluid 102 communicates from the inlet port 180A to the outlet port 180B. The inlet port 180A is in communication with the main supply line 126. The outlet port 180B is in communication with a fluid line 192. The exhaust port 180C is in communication with the sump 104.

The second synchronizer pressure or flow control solenoid 182 is preferably an electrically controlled variable force solenoid, but can be a variable flow solenoid. The second synchronizer pressure or flow control solenoid 182 is operable to control the pressure or flow of hydraulic fluid 102 delivered to another side of each of the synchronizer actuators 190A-D, as will be described in greater detail below. The second synchronizer pressure or flow control solenoid 182 includes an inlet port 182A that communicates with an outlet port 182B when the second synchronizer pressure or flow control solenoid 182 is activated or energized and includes an exhaust port 182C that communicates with the outlet port 182B when the second synchronizer pressure or flow control solenoid 182 is inactive or de-energized. Variable activation of the second synchronizer pressure or flow control solenoid 182 regulates or controls the pressure or flow of the hydraulic fluid 102 as the hydraulic fluid 102 communicates from the inlet port 182A to the outlet port 182B. The inlet port 182A is in communication with the main supply line 126. The outlet port 182B is in communication with a fluid line 194. The exhaust port 182C is in communication with the sump 104.

The first logic valve assembly 184 is in communication with both the first and second synchronizer pressure or flow control solenoids 180, 182 via the fluid lines 192 and 194. The first logic valve assembly 184 is operable to direct pressurized hydraulic fluid 102 from the first and second synchronizer pressure or flow control solenoids 180, 182 to the second and third logic valve assemblies 186, 188 as will be described in greater detail below. The first logic valve assembly 184 includes a first inlet port 184A, a second inlet port 184B, a first outlet port 184C, a second outlet port 184D, a third outlet port 184E, a fourth outlet port 184F, exhaust ports 184G-I, and an actuation port 184J. The first inlet port 184A is in communication with fluid line 192. The second inlet port 184B is in communication with fluid line 194. The first outlet port 184C is in communication with a fluid line 196. The second outlet port 184D is in communication with a fluid line 198. The third outlet port 184E is in communication with a fluid line 200. The fourth outlet port 184F is in communication with a fluid line 202. The exhaust ports 184G-I are in communication with the sump 104. The actuation port 184J is in communication with a fluid line 204 which in turn communicates with a first solenoid 206.

The first solenoid 206 is preferably an electrically controlled on/off solenoid. The first solenoid 206 is operable to control the flow of hydraulic fluid 102 delivered from a supply solenoid line 208 to the fluid line 204. The solenoid supply line 208 in turn communicates with the switching valve assembly 154. The switching valve assembly 154 directs hydraulic fluid flow from either fluid line 150 or fluid line 164 to the solenoid supply line 208. In another embodiment, the switching valve assembly 154 is replaced with a three way check ball valve such that whichever of the fluid lines 150 and 164 delivers a higher pressure of hydraulic fluid 102 to the three way ball check valve communicates the hydraulic fluid 102 to the solenoid supply line 208.

The first logic valve assembly 184 further includes a valve 210 slidably disposed within a bore 212. The valve 210 is moveable between at least two positions by the first solenoid 206. A biasing member 214 acts on an end of the valve 210 to bias the valve 210 to a de-stroked position. When the first solenoid 206 is energized, hydraulic fluid 102 communicates through the switching valve 154 to the first solenoid 206, through the first solenoid 206 to the actuation port 184J and the hydraulic fluid 102 acts on an end of the valve 210 to move the valve 210 to a stroked position against the bias of the biasing member 214. When the first solenoid 206 is de-energized, the biasing member 214 moves the valve 210 to the de-stroked position. When the valve 210 is in the de-stroked position (as shown in FIG. 2B), the first inlet port 184A is in communication with the second outlet port 184D, the second inlet port 184B is in communication with the fourth outlet port 184F, and the first and third outlet ports 184C, 184E are in communication with the exhaust ports 184G and 184H, respectively. Accordingly, when the first solenoid 206 is de-energized and the valve 210 is in the de-stroked position, pressurized hydraulic fluid 102 from the first and second synchronizer pressure or flow control solenoids 180, 182 is communicated to the third logic valve assembly 188. When the valve 210 is in the stroked position, the first inlet port 184A is in communication with the first outlet port 184C, the second inlet port 184B is in communication with the third outlet port 184E, and the second and fourth outlet ports 184D, 184F are in communication with the exhaust ports 184H and 184I, respectively. Therefore, when the first solenoid 206 is energized and the valve 210 is in the stroked position, pressurized hydraulic fluid 102 from the first and second synchronizer pressure or flow control solenoids 180, 182 is communicated to the second logic valve assembly 186.

The second logic valve assembly 186 is operable to direct pressurized hydraulic fluid 102 from the first logic valve assembly 184 to the first synchronizer actuator 190A and to the second synchronizer actuator 190B, as will be described in greater detail below. The second logic valve assembly 186 includes a first inlet port 186A, a second inlet port 186B, a first outlet port 186C, a second outlet port 186D, a third outlet port 186E, a fourth outlet port 186F, exhaust ports 186G-I, and an actuation port 186J. The first inlet port 186A is in communication with fluid line 196. The second inlet port 186B is in communication with fluid line 200. The first outlet port 186C is in communication with a fluid line 220. The second outlet port 186D is in communication with a fluid line 222. The third outlet port 186E is in communication with a fluid line 224. The fourth outlet port 186F is in communication with a fluid line 226. The exhaust ports 186G-I are in communication with the sump 104. The actuation port 186J is in communication with a fluid line 228 which in turn communicates with a second solenoid 230.

The second solenoid 230 is preferably an electrically controlled on/off solenoid. The second solenoid 230 is operable to control the flow of hydraulic fluid 102 delivered from the supply solenoid line 208 to the fluid line 228.

The second logic valve assembly 186 further includes a valve 232 slidably disposed within a bore 234. The valve 232 is moveable between at least two positions by the second solenoid 230. A biasing member 236 acts on an end of the valve 232 to bias the valve 232 to a de-stroked position. When the second solenoid 230 is energized, hydraulic fluid 102 communicates through the switching valve 154 to the second solenoid 230, through the second solenoid 230 to the actuation port 186J and the hydraulic fluid 102 acts on an end of the valve 232 to move the valve 232 to a stroked position against the bias of the biasing member 236. When the second solenoid 230 is de-energized, the biasing member 236 moves the valve 232 to the de-stroked position. When the valve 232 is in the de-stroked position (as shown in FIG. 2B), the first inlet port 186A is in communication with the second outlet port 186D, the second inlet port 186B is in communication with the fourth outlet port 186F, and the first and third outlet ports 186C, 186E are in communication with the exhaust ports 186G and 186H, respectively. Accordingly, when the second solenoid 230 is de-energized and the valve 232 is in the de-stroked position, pressurized hydraulic fluid 102 from the first logic valve assembly 184 is communicated to the second synchronizer actuator 190B via fluid lines 222 and 226. When the valve 232 is in the stroked position, the first inlet port 186A is in communication with the first outlet port 186C, the second inlet port 186B is in communication with the third outlet port 186E, and the second and fourth outlet ports 186D, 186F are in communication with the exhaust ports 186H and 186I, respectively. Therefore, when the second solenoid 230 is energized and the valve 232 is in the stroked position, pressurized hydraulic fluid 102 from the first logic valve assembly 184 is communicated to the first synchronizer actuator 190A via fluid lines 220 and 224.

The third logic valve assembly 188 is operable to direct pressurized hydraulic fluid 102 from the first logic valve assembly 184 to the third synchronizer actuator 190C and to the fourth synchronizer actuator 190D, as will be described in greater detail below. The third logic valve assembly 188 includes a first inlet port 188A, a second inlet port 188B, a first outlet port 188C, a second outlet port 188D, a third outlet port 188E, a fourth outlet port 188F, exhaust ports 188G-I, and an actuation port 188J. The first inlet port 188A is in communication with fluid line 198. The second inlet port 188B is in communication with fluid line 202. The first outlet port 188C is in communication with a fluid line 240. The second outlet port 188D is in communication with a fluid line 242. The third outlet port 188E is in communication with a fluid line 244. The fourth outlet port 188F is in communication with a fluid line 246. The exhaust ports 188G-I are in communication with the sump 104. The actuation port 188J is in communication with the fluid line 228.

The third logic valve assembly 188 further includes a valve 250 slidably disposed within a bore 252. The valve 250 is moveable between at least two positions by the second solenoid 230. A biasing member 254 acts on an end of the valve 250 to bias the valve 250 to a de-stroked position. When the second solenoid 230 is energized, hydraulic fluid 102 communicates through the switching valve 154 to the second solenoid 230, through the second solenoid 230 to the actuation port 188J and the hydraulic fluid 102 acts on an end of the valve 250 to move the valve 250 to a stroked position against the bias of the biasing member 254. When the second solenoid 230 is de-energized, the biasing member 254 moves the valve 250 to the de-stroked position. When the valve 250 is in the de-stroked position (as shown in FIG. 2B), the first inlet port 188A is in communication with the second outlet port 188D, the second inlet port 188B is in communication with the fourth outlet port 188F, and the first and third outlet ports 188C, 188E are in communication with the exhaust ports 188G and 188H, respectively. Accordingly, when the second solenoid 230 is de-energized and the valve 250 is in the de-stroked position, pressurized hydraulic fluid 102 from the first logic valve assembly 184 is communicated to the fourth synchronizer actuator 190D via fluid lines 242 and 246. When the valve 250 is in the stroked position, the first inlet port 188A is in communication with the first outlet port 188C, the second inlet port 188B is in communication with the third outlet port 188E, and the second and fourth outlet ports 188D, 188F are in communication with the exhaust ports 188H and 188I, respectively. Therefore, when the second solenoid 230 is energized and the valve 250 is in the stroked position, pressurized hydraulic fluid 102 from the first logic valve assembly 184 is communicated to the third synchronizer actuator 190C via fluid lines 240 and 244.

The synchronizer actuators 190A-D are preferably two-area piston assemblies operable to each engage or actuate a shift rail in a synchronizer assembly, but can be three-area piston assemblies. More specifically, the first synchronizer actuator 190A is operable to actuate the first synchronizer assembly 30A, the second synchronizer actuator 190B is operable to actuate the second synchronizer assembly 30B, the third synchronizer actuator 190C is operable to actuate the third synchronizer assembly 30C, and the fourth synchronizer actuator 190D is operable to actuate the fourth synchronizer assembly 30D.

The first synchronizer actuator 190A includes a piston 256 slidably disposed within a piston housing or cylinder 258. The piston 256 presents two separate areas for pressurized hydraulic fluid to act upon. The piston 256 engages or contacts a finger lever or other shift rail component (not shown) of the first synchronizer assembly 30A. The first synchronizer actuator 190A includes a fluid port 260 that communicates with one end of the piston 256 and a fluid port 262 that communicates with an opposite end of the piston 256. Fluid port 260 is in communication with fluid line 220 and fluid port 262 is in communication with fluid line 224. Accordingly, the pressurized hydraulic fluid 102 communicated from the second logic valve assembly 186 enters the first synchronizer actuator 190A through the fluid ports 260, 262 and contacts the piston 256. The difference in pressure between the hydraulic fluid delivered to fluid port 260 from the first synchronizer pressure or flow control solenoid 180 and the hydraulic fluid delivered to fluid port 262 from the second synchronizer pressure or flow control solenoid 182 moves the piston 256 between various positions. First and second the synchronizer pressure or control solenoids 180, 182 are variable force solenoids (VFS) that are direct acting and could be either pressure control or flow control devices. Each position in turn corresponds to a position of the shift rail of the first synchronizer assembly 30A (i.e., engaged left, engaged right, and neutral).

The second synchronizer actuator 190B includes a piston 264 slidably disposed within a piston housing or cylinder 266. The piston 264 presents two separate areas for pressurized hydraulic fluid to act upon. The piston 264 engages or contacts a finger lever or other shift rail component (not shown) of the second synchronizer assembly 30B. The second synchronizer actuator 190B includes a fluid port 268 that communicates with one end of the piston 264 and a fluid port 270 that communicates with an opposite end of the piston 264. Fluid port 268 is in communication with fluid line 226 and fluid port 270 is in communication with fluid line 222. Accordingly, the pressurized hydraulic fluid 102 communicated from the second logic valve assembly 186 enters the second synchronizer actuator 190B through the fluid ports 268, 270 and contacts the piston 264. The difference in pressure between the hydraulic fluid delivered to fluid port 270 from the first synchronizer pressure or flow control solenoid 180 and the hydraulic fluid delivered to fluid port 268 from the second synchronizer pressure or flow control solenoid 182 moves the piston 264 between various positions. Each position in turn corresponds to a position of the shift rail of the first synchronizer assembly 30B (i.e., engaged left, engaged right, and neutral).

The third synchronizer actuator 190C includes a piston 272 slidably disposed within a piston housing or cylinder 274. The piston 272 presents two separate areas for pressurized hydraulic fluid to act upon. The piston 272 engages or contacts a finger lever or other shift rail component (not shown) of the third synchronizer assembly 30C. The third synchronizer actuator 190C includes a fluid port 276 that communicates with one end of the piston 272 and a fluid port 278 that communicates with an opposite end of the piston 272. Fluid port 276 is in communication with fluid line 240 and fluid port 278 is in communication with fluid line 244. Accordingly, the pressurized hydraulic fluid 102 communicated from the third logic valve assembly 188 enters the third synchronizer actuator 190C through the fluid ports 276, 278 and contacts the piston 272. The difference in pressure between the hydraulic fluid delivered to fluid port 276 from the first synchronizer pressure or flow control solenoid 180 and the hydraulic fluid delivered to fluid port 278 from the second synchronizer pressure or flow control solenoid 182 moves the piston 272 between various positions. Each position in turn corresponds to a position of the shift rail of the third synchronizer assembly 30C (i.e., engaged left, engaged right, and neutral).

The fourth synchronizer actuator 190D includes a piston 280 slidably disposed within a piston housing or cylinder 282. The piston 280 presents two separate areas for pressurized hydraulic fluid to act upon. The piston 280 engages or contacts a finger lever or other shift rail component (not shown) of the fourth synchronizer assembly 30D. The fourth synchronizer actuator 190D includes a fluid port 284 that communicates with one end of the piston 280 and a fluid port 286 that communicates with an opposite end of the piston 280. Fluid port 284 is in communication with fluid line 246 and fluid port 286 is in communication with fluid line 242. Accordingly, the pressurized hydraulic fluid 102 communicated from the third logic valve assembly 188 enters the fourth synchronizer actuator 190D through the fluid ports 284, 286 and contacts the piston 280. The difference in pressure between the hydraulic fluid delivered to fluid port 286 from the first synchronizer pressure or flow control solenoid 180 and the hydraulic fluid delivered to fluid port 284 from the second synchronizer pressure or flow control solenoid 182 moves the piston 280 between various positions. Each position in turn corresponds to a position of the shift rail of the fourth synchronizer assembly 30D (i.e., engaged left, engaged right, and neutral).

During general operation of the hydraulic control system 100, the accumulator 130 provides the pressurized hydraulic fluid 102 throughout the system and the pump 106 is employed to charge the accumulator 130. Selection of a particular forward or reverse gear ratio is achieved by selectively actuating one of the torque transmitting devices 22, 24 and selectively actuating one of the synchronizer assemblies 30A-D. It should be appreciated that which actuator assembly 30A-D and which torque transmitting device 22, 24 provide which forward or reverse gear ratio may vary without departing from the scope of the present invention. To select a specific gear state, first either the first pressure control solenoid 138 or the second pressure control solenoid 144 are energized such that hydraulic fluid 102 is supplied to the supply valve 154. This allows the solenoids 206 and 230 to be supplied with hydraulic fluid 102 in order to command the correct gear state. Next, synchronizer pressure or flow control solenoids 180 and 182 are selectively engaged to engage the desired gear. Finally, solenoids 140 and 146 are selectively actuated to engage the correct clutch for the selected gear.

To actuate the first synchronizer assembly 30A, the first solenoid 206 is energized to move the first logic valve assembly 184 to the stroked position and the second solenoid 230 is energized to move the second logic valve assembly 186 to the stroked position. In addition, one of the first and second torque transmitting devices 22, 24 are engaged as described above. Bi-directional translation of the first synchronizer assembly 30A is then achieved by selectively energizing the synchronizer pressure or flow control solenoids 180, 182. For example, synchronizer pressure or flow control solenoid 180 is energized to move the first synchronizer actuating assembly 190A and therefore the first synchronizer assembly 30A to a first engaged position, synchronizer pressure or flow control solenoid 182 is energized to move the first synchronizer actuating assembly 190A and therefore the first synchronizer assembly 30A to a second engaged position, and both synchronizer pressure or flow control solenoids 180, 182 are engaged to provide a neutral position.

To actuate the second synchronizer assembly 30B, the first solenoid 206 is energized to move the first logic valve assembly 184 to the stroked position and the second solenoid 230 is de-energized to move the second logic valve assembly 186 to the de-stroked position. In addition, one of the first and second torque transmitting devices 22, 24 are engaged as described above. Bi-directional translation of the second synchronizer assembly 30B is then achieved by selectively energizing the synchronizer pressure or flow control solenoids 180, 182. For example, synchronizer pressure or flow control solenoid 180 is energized to move the second synchronizer actuating assembly 190B and therefore the second synchronizer assembly 30B to a first engaged position, synchronizer pressure or flow control solenoid 182 is energized to move the second synchronizer actuating assembly 190B and therefore the second synchronizer assembly 30B to a second engaged position, and both synchronizer pressure or flow control solenoids 180, 182 are engaged to provide a neutral position.

To actuate the third synchronizer assembly 30C, the first solenoid 206 is de-energized to move the first logic valve assembly 184 to the de-stroked position and the second solenoid 230 is energized to move the third logic valve assembly 188 to the stroked position. In addition, one of the first and second torque transmitting devices 22, 24 are engaged as described above. Bi-directional translation of the third synchronizer assembly 30C is then achieved by selectively energizing the synchronizer pressure or flow control solenoids 180, 182. For example, synchronizer pressure or flow control solenoid 180 is energized to move the third synchronizer actuating assembly 190C and therefore the third synchronizer assembly 30C to a first engaged position, synchronizer pressure or flow control solenoid 182 is energized to move the third synchronizer actuating assembly 190C and therefore the third synchronizer assembly 30C to a second engaged position, and both synchronizer pressure or flow control solenoids 180, 182 are engaged to provide a neutral position.

To actuate the fourth synchronizer assembly 30D, the first solenoid 206 is de-energized to move the first logic valve assembly 184 to the de-stroked position and the second solenoid 230 is de-energized to move the third logic valve assembly 188 to the de-stroked position. In addition, one of the first and second torque transmitting devices 22, 24 are engaged as described above. Bi-directional translation of the fourth synchronizer assembly 30D is then achieved by selectively energizing the synchronizer pressure or flow control solenoids 180, 182. For example, synchronizer pressure or flow control solenoid 180 is energized to move the fourth synchronizer actuating assembly 190D and therefore the fourth synchronizer assembly 30D to a first engaged position, synchronizer pressure or flow control solenoid 182 is energized to move the fourth synchronizer actuating assembly 190D and therefore the fourth synchronizer assembly 30D to a second engaged position, and both synchronizer pressure or flow control solenoids 180, 182 are engaged to provide a neutral position.

To engage or actuate the first torque transmitting device 22, the first pressure control solenoid 138 and the first clutch flow control solenoid 140 are energized. To engage or actuate the second torque transmitting device 24, the second pressure control solenoid 144 and the second clutch flow control solenoid 146 are energized.

The description of the invention is merely exemplary in nature and variations that do not depart from the general essence of the invention are intended to be within the scope of the invention. Such variations are not to be regarded as a departure from the spirit and scope of the invention.

The invention claimed is:

1. A hydraulic control system for controlling a dual clutch transmission, the hydraulic control system comprising:
   a source of pressurized hydraulic fluid;
   a first, a second, a third and a fourth variable force solenoid in downstream fluid communication with the source of pressurized hydraulic fluid;
   a first flow control solenoid in downstream fluid communication with the first variable force solenoid;
   a second flow control solenoid in downstream fluid communication with the second variable force solenoid;
   a first clutch actuator in downstream fluid communication with the first flow control solenoid for selectively actuating a first clutch of the dual clutch transmission;
   a second clutch actuator in downstream fluid communication with the second flow control solenoid for selectively actuating a second clutch of the dual clutch transmission;
   a first logic valve assembly in downstream fluid communication with the third and the fourth variable force solenoids, wherein the first logic valve assembly has a valve movable between a first and a second position;
   a second logic valve assembly in downstream fluid communication with the first logic valve assembly, wherein the second logic valve assembly has a valve movable between a first and a second position;
   a third logic valve assembly in downstream fluid communication with the first logic valve assembly wherein the third logic valve assembly has a valve movable between a first and a second position;
   a first actuator in downstream fluid communication with the second logic valve assembly, wherein the first actuator is movable between a first and second position when the valve of the first logic control valve assembly is in the first position and the valve of second logic control valve assembly is in the first position;
   a second actuator in downstream fluid communication with the second logic valve assembly, wherein the second actuator is movable between a first and second position when the valve of the first logic valve assembly is in the first position and the valve of second logic valve assembly is in the second position;
   a third actuator in downstream fluid communication with the third logic valve assembly, wherein the third actuator is movable between a first and second position when the valve of the first logic valve assembly is in the second position and the valve of third logic valve assembly is in the first position; and
   a fourth actuator in downstream fluid communication with the third logic valve assembly, wherein the fourth actuator is movable between a first and second position when the valve of the first logic valve assembly is in the second position and the valve of third logic valve assembly is in the second position, and
   wherein the third variable force solenoid modulates a first hydraulic fluid pressure to move at least one of the four actuators into the first position and the fourth variable force solenoid modulates a second hydraulic fluid pressure to move the at least one of the four actuators into the second position.

2. The hydraulic control system of claim 1 further comprising a first valve control solenoid in upstream fluid communication with the first logic valve assembly.

3. The hydraulic control system of claim 2 further comprising a second valve control solenoid in upstream fluid communication with the second and third logic valve assembly.

4. The hydraulic control system of claim 3 further comprising a switching solenoid in downstream fluid communication with the first and second variable force solenoids and in upstream fluid communication with the first and second valve control solenoids.

5. The hydraulic control system of claim 4 wherein the first variable force solenoid has an output port in upstream communication with the first flow control solenoid and the switching solenoid.

6. The hydraulic control system of claim 5 wherein the second variable force solenoid has an output port in upstream communication with the second flow control solenoid and the switching solenoid.

7. The hydraulic control system of claim 6 further comprising a first check ball valve in downstream fluid communication with the first variable force solenoid, the first flow control solenoid and the first clutch actuator and upstream fluid communication with the switching solenoid.

8. The hydraulic control system of claim 7 further comprising a second check ball valve in downstream fluid communication with the second variable force solenoid, the second flow control solenoid and the second clutch actuator and upstream fluid communication with the switching solenoid.

9. A hydraulic control system for controlling a dual clutch and a plurality of synchronizers in a transmission, the hydraulic control system comprising:
   a source of pressurized hydraulic fluid;
   a first, a second, a third and a fourth variable force solenoids each having an inlet port in downstream fluid communication with the source of pressurized hydraulic fluid;
   a first flow control solenoid having an inlet port in downstream fluid communication with an outlet port of the first variable force solenoid;
   a second flow control solenoid having an inlet port in downstream fluid communication with an outlet port of the second variable force solenoid;
   a first clutch actuator having a piston chamber in downstream fluid communication with an outlet port of the first flow control solenoid for selectively actuating a first clutch of the dual clutch;
   a second clutch actuator having a piston chamber in downstream fluid communication with an outlet port of the second flow control solenoid for selectively actuating a second clutch of the dual clutch;
   a first logic valve assembly in downstream fluid communication with an outlet port of the third variable force solenoid and an outlet port of the fourth variable force solenoid, wherein the first logic valve assembly has a valve movable between a first and a second position;
   a second logic valve assembly in downstream fluid communication with at least two outlet ports of the first logic valve assembly, wherein the second logic valve assembly has a valve movable between a first and a second position;
   a third logic valve assembly in downstream fluid communication with at least two other outlet ports of the first logic valve assembly wherein the third logic valve assembly has a valve movable between a first and a second position;
   a first synchronizer actuator in downstream fluid communication with the second logic valve assembly, wherein the first synchronizer actuator is movable between a first and second position when the valve of the first logic valve assembly is in the first position and the valve of second logic valve assembly is in the first position;
   a second synchronizer actuator in downstream fluid communication with the second logic valve assembly, wherein the second synchronizer actuator is movable between a first and second position when the valve of the first logic valve assembly is in the first position and the valve of second logic valve assembly is in the second position;
   a third synchronizer actuator in downstream fluid communication with the third logic valve assembly, wherein the third synchronizer actuator is movable between a first and second position when the valve of the first logic valve assembly is in the second position and the valve of third logic valve assembly is in the first position; and
   a fourth synchronizer actuator in downstream fluid communication with the third logic valve assembly, wherein the fourth synchronizer actuator is movable between a first and second position when the valve of the first logic valve assembly is in the second position and the valve of third logic valve assembly is in the second position, and
   wherein the third variable force solenoid modulates a first hydraulic fluid pressure to move at least one of the four synchronizer actuators into the first position and the fourth variable force solenoid modulates a second hydraulic fluid pressure to move the at least one of the four synchronizer actuators into the second position.

10. The hydraulic control system of claim 9 further comprising a first valve control solenoid in upstream fluid communication with the first logic valve assembly.

11. The hydraulic control system of claim 10 further comprising a second valve control solenoid in upstream fluid communication with the second and third logic valve assembly.

12. The hydraulic control system of claim 11 further comprising a switching valve assembly in downstream fluid communication with the first and second variable force solenoids and in upstream fluid communication with the first and second valve control solenoids.

13. The hydraulic control system of claim 12 wherein the first variable force solenoid has an output port in upstream communication with the first flow control solenoid and the switching valve assembly.

14. The hydraulic control system of claim 13 wherein the second variable force solenoid has an output port in upstream communication with the second flow control solenoid and the switching valve assembly.

15. The hydraulic control system of claim 14 further comprising a first check ball valve in downstream fluid communication with an outlet port of the first variable force solenoid, the first flow control solenoid and the first clutch actuator and upstream fluid communication with the switching valve assembly.

16. The hydraulic control system of claim 15 further comprising a second check ball valve in downstream fluid communication with an outlet port of the second variable force solenoid, the second flow control solenoid and the second clutch actuator and upstream fluid communication with the switching valve assembly.

17. A hydraulic control system for controlling a dual clutch and a plurality of synchronizers in a transmission, the hydraulic control system comprising:
   a source of pressurized hydraulic fluid;
   a first, a second, a third and a fourth variable force solenoid each having an inlet port in downstream fluid communication with the source of pressurized hydraulic fluid;
   a first flow control solenoid having an inlet port in downstream fluid communication with an outlet port of the first variable force solenoid;

a second flow control solenoid having an inlet port in downstream fluid communication with an outlet port of the second variable force solenoid;

a first clutch actuator having a piston chamber in downstream fluid communication with an outlet port of the first flow control solenoid for selectively actuating a first clutch of the dual clutch;

a second clutch actuator having a piston chamber in downstream fluid communication with an outlet port of the second flow control solenoid for selectively actuating a second clutch of the dual clutch;

a first logic valve assembly in downstream fluid communication with an outlet port of the third variable force solenoid and an outlet port of the fourth variable force solenoid, wherein the first logic valve assembly has a valve movable between a first and a second position;

a second logic valve assembly in downstream fluid communication with at least two outlet ports of the first logic valve assembly, wherein the second logic valve assembly has a valve movable between a first and a second position;

a third logic valve assembly in downstream fluid communication with at least two other outlet ports of the first logic valve assembly wherein the third logic valve assembly has a valve movable between a first and a second position;

a first valve control solenoid in upstream fluid communication with the first logic valve assembly for selectively moving the valve of the first logic valve assembly between the first and the second position;

a second valve control solenoid in upstream fluid communication with the second logic valve assembly and the third logic valve assembly for selectively moving the valve of the second logic valve assembly between the first and the second position and the valve of the third logic valve assembly between the first and the second position;

a switching valve assembly in downstream fluid communication with the first and second variable force solenoids and in upstream fluid communication with the first and second valve control solenoids;

a first synchronizer actuator in downstream fluid communication with the second logic valve assembly, wherein the first synchronizer actuator is movable between a first and second position when the valve of the first logic valve assembly is in the first position and the valve of second logic valve assembly is in the first position;

a second synchronizer actuator in downstream fluid communication with the second logic valve assembly, wherein the second synchronizer actuator is movable between a first and second position when the valve of the first logic valve assembly is in the first position and the valve of second logic valve assembly is in the second position;

a third synchronizer actuator in downstream fluid communication with the third logic valve assembly, wherein the third synchronizer actuator is movable between a first and second position when the valve of the first logic valve assembly is in the second position and the valve of third logic valve assembly is in the first position; and a fourth synchronizer actuator in downstream fluid communication with the third logic valve assembly, wherein the fourth synchronizer actuator is movable between a first and second position when the valve of the first logic valve assembly is in the second position and the valve of third logic valve assembly is in the second position, and wherein the third variable force solenoid modulates a first hydraulic fluid pressure to move at least one of the four synchronizer actuators into the first position and the fourth variable force solenoid modulates a second hydraulic fluid pressure to move the at least one of the four synchronizer actuators into the second position.

* * * * *